(12) United States Patent
Muramoto

(10) Patent No.: US 7,006,691 B2
(45) Date of Patent: Feb. 28, 2006

(54) PROFILE CORRECTION APPARATUS AND PROFILE CORRECTION PROGRAM STORAGE MEDIUM

(75) Inventor: Yasuhiko Muramoto, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 505 days.

(21) Appl. No.: 10/139,519

(22) Filed: May 7, 2002

(65) Prior Publication Data

US 2002/0168104 A1 Nov. 14, 2002

(30) Foreign Application Priority Data

May 11, 2001 (JP) .............................. 2001-141389

(51) Int. Cl.
*G06K 9/00* (2006.01)

(52) U.S. Cl. .................. 382/167; 358/518; 358/1.9

(58) Field of Classification Search ................ 382/162, 382/167, 254, 274, 275; 358/1.9, 504, 518, 358/520, 522–525; 345/600–604, 589
See application file for complete search history.

(56) References Cited

U.S. PATENT DOCUMENTS

| 5,999,703 | A | * | 12/1999 | Schwartz et al. | ............ 358/1.9 |
| 6,008,907 | A | * | 12/1999 | Vigneau et al. | ............... 358/1.9 |
| 6,075,888 | A | * | 6/2000 | Schwartz | ..................... 382/167 |
| 6,268,930 | B1 | * | 7/2001 | Ohta et al. | ................... 358/1.9 |

\* cited by examiner

*Primary Examiner*—Joe Mancuso
*Assistant Examiner*—Ishrat Sherali
(74) *Attorney, Agent, or Firm*—Sughrue Mion, PLLC

(57) ABSTRACT

A profile correction apparatus has a measured value obtaining section for obtaining measured values in which a predetermined physical amount involved in colors of color patches constituting a chart is measured, and a correction section for correcting the post-stage sections to reduce a difference between the colors of the color patches and a predetermined target color in accordance with the measured values obtained in the measured value obtaining section.

10 Claims, 9 Drawing Sheets

PROFILE CORRECTION APPARATUS AND PROFILE CORRECTION PROGRAM STORAGE MEDIUM

BACKGROUND OF THE INVENTION

1. Field of the Invention

The present invention relates to a profile correction apparatus for correcting a color profile defining a coordinate conversion among a plurality of color spaces, and a profile correction program storage medium storing a profile correction program which causes a computer to operate as the profile correction apparatus when the profile correction program is incorporated into the computer.

2. Description of the Related Art

Recently, computerization and digitalization advance in a printing field too. For example, in the event that a printed matter of a color image is produced, image data is generated in such a matter that the color image is read by a color scanner to obtain image data (CMY data) representative of three colors of, for example, cyan (C), magenta (M), and yellow (Y), and color images represented by the obtained image data are edited on a display screen, so that image data representative of the edited color image is created. The image data thus created are created in form of image data (CMYK data) representative of four colors of, for example, cyan (C), magenta (M), yellow (Y), and black (K). Machine plates, which carry halftone dot images for those four colors, respectively, are created in accordance with the image data. The machine plates thus created are mounted on a printing machine so that the halftone dot images of CMYK four colors are printed in such a manner that those halftone dot images are superposed on one another. Thus, there is produced a printed matter of the color image consisting of those halftone dot images. A system for creating a printed matter upon receipt of CMY data after editing is referred to as a printing system hereinafter.

This printing system is a sort of image output system wherein first image data in which a color of a color image is represented in a first color space is converted into second image data in which a color of a color image is represented in a second color space, and a color image is outputted in accordance with the second image data. The conversion of the image data, which is performed by the image output system, is a conversion taking notice of colors as will be described later, and is referred to as a color conversion. A portion for implementing the function of the color conversion in the image output system is referred to as a color conversion section. A portion of outputting a color image in accordance with the image data after the color conversion in the image output system is referred to as an image output section. In the above-mentioned printing system, an image setter to a printing machine is the image output section.

In the printing field, as another sort of the image output system, there is known a proof system wherein a color image in a printed matter is reproduced by a high-performance printer capable of creating a halftone dot structure. According to the proof system, the CMY data after editing is converted into image data for a printer so that the high-performance printer outputs a color image represented by the image data. According to the proof system, the image output section comprises a printer.

It is known that an ability of the image output section incorporated into the image output system for outputting a color image changes with the passage of time, and colors of the color image also changes with the passage of time. For this reason, even if there are constructed a printing system capable of outputting a color image edited on a display of an editing apparatus with a faithful color and a proof system capable of exactly reproducing a color of a printed matter, a color of the color image outputted will change to a color different from the original color with the passage of time.

In order to obtain a color image of the original color through correction of the change with the elapse, hitherto, a structure of halftone dots constituting the color image is corrected. However, a scheme of creating a structure of halftone dots is varied in accordance with a maker of an image output section that is incorporated into an image output system. For this reason, even if there are developed correction algorithm and correction program capable of correcting the change with the elapse in the image output section of a specified maker, it is difficult to introduce the correction algorithm and the like into the image output section of another maker, and it is low in general-purpose properties.

By the way, it is known that even if the second data is the same image data, for example, (C, M, Y, K)=(50, 50, 100, 100), a color of a color image, which is outputted by the image output section in accordance with the image data, is varied in accordance with a type of an apparatus constituting the image output section. The color conversion section of the above-mentioned image output system converts the first image data representative of a certain image into the second image data according to the image output section in order to remove the difference of a color. The conversion (the color conversion) from the first image data to the second image data is considered as the coordinate conversion among a plurality of color spaces. This color conversion is adopted, not restricted to the printing field, in order to unify colors of color images among a plurality of sorts of apparatuses such as scanners and displays. Generally, in such a color conversion, there is adopted a color profile in which the above-mentioned coordinate conversion is defined by a LUT (Look Up Table) format and the like. Further, as a color profile used in the color conversion, generally, there is adopted a united form of color profile such as an ICC profile.

In view of the foregoing, as a method of removing the above-mentioned change with elapse, there is considered a method of making over again the color profile. According to this method, in the event that a maker of a certain image output system develops a creating algorithm for making over again a color profile, it is easy to introduce the creating algorithm into the image output system of another maker, and it is high in general-purpose properties.

However, to create the color profile, there is a need that an image output system outputs a large number of color patches, and a colorimeter measures colors of the color patches. Such a measure is very troublesome. While there is a colorimeter for automatically measuring a color patch, such a colorimeter is expensive, and it is difficult for a user of the image output system to possess the colorimeter for the purpose of correction of change with elapse in the image output system. Thus, it is desired to develop a profile correction apparatus capable of correcting a color profile without spending a great deal of time and effort.

Such a profile correction apparatus is desired in not only a printing field, but also the whole fields using the image output system involved in change with elapse.

SUMMARY OF THE INVENTION

In view of the foregoing, it is an object of the present invention to provide a profile correction apparatus for correcting a color profile capable of correcting a color profile without spending a great deal of time and effort, and a profile correction program storage medium storing a profile correction program which causes a computer to operate as the profile correction apparatus when the profile correction program is incorporated into the computer.

To achieve the above-mentioned object, the present invention provides a profile correction apparatus comprising:

a measured value obtaining section for obtaining measured values in which a predetermined physical amount involved in colors of color patches is measured, said color patches being outputted by an image output system in which first image data wherein colors of a color image are represented with a first color space is converted into second image data wherein the colors of the color image are represented with a second color space in accordance with a color profile, and the color image is outputted in accordance with the second image data, said color profile consisting of a plurality of pre-stage sections defining linear conversions of a plurality of coordinate components in the first color space, a middle stage section defining a coordinate conversion from the first color space to the second color space, and a plurality of post-stage sections defining linear conversions of a plurality of coordinate components in the second color space; and a correction section for correcting the post-stage sections to reduce a difference between the colors of the color patches outputted by said image output system and a predetermined target color in accordance with the measured values obtained in said measured value obtaining section.

Here, the "measured values" include all sorts of measured value capable of computing colors of color patches, for example, colorimeter values represented by CIEXYZ values, optical density values, and dot percent.

The first color space and the second color space are ones selected among an RGB color space, a CIELAB color space, a CIEXYZ color space, a CMY color space, a CMYK color space, etc. And it is permitted that both the first color space and the second color space are a color space (for example, the RGB color space) of the same coordinate system.

According to the profile correction apparatus of the present invention, the correction of the color profile is performed by correction of the post-stage section of a color profile having a three-stage structure consisting of the pre-stage section, the middle stage section and the post-stage section. Since the above-mentioned ICC profile has such a three-stage structure, the profile correction apparatus is high in general-purpose properties. Further, according to the profile correction apparatus of the present invention, the post-stage section can be corrected in accordance with a small amount of color patches, and thus it is possible to readily correct the color profile saving one trouble.

In the profile correction apparatus according to the present invention as mentioned above, it is acceptable that said measured value obtaining section obtains measured values in which optical densities associated with the plurality of coordinate components in the second color space are measured on primary color patches outputted by said image output system.

Or alternatively it is acceptable that said measured value obtaining section obtains colorimeter values on mixed color patches outputted by said image output system.

In the event that the measured value obtaining section obtains measured values of the optical density, it is permitted to use a cheap densitometer to correct a color profile. Further, in the event that the measured value obtaining section obtains colorimeter values of the mixed color patches, it is possible to correct the color profile in accordance with particularly few color patches, and also possible to perform a correction taking into consideration the influence of overlapping of halftone dots in the event that the mixed color is created through overlapping of halftone dots of a plurality of primary colors. Here, it is acceptable that the mixed color patch is neutral tints of patch including a plurality of primary colors, or a gray of patch including all primary colors.

To achieve the above-mentioned object, the present invention provides a profile correction program storage medium storing a profile correction program which causes a computer to operate as a profile correction apparatus, when said profile correction program is incorporated into the computer, said profile correction apparatus comprising:

a measured value obtaining section for obtaining measured values in which a predetermined physical amount involved in colors of color patches is measured, said color patches being outputted by an image output system in which first image data wherein colors of a color image are represented with a first color space is converted into second image data wherein the colors of the color image are represented with a second color space in accordance with a color profile, and the color image is outputted in accordance with the second image data, said color profile consisting of a plurality of pre-stage sections defining linear conversions of a plurality of coordinate components in the first color space, a middle stage section defining a coordinate conversion from the first color space to the second color space, and a plurality of post-stage sections defining linear conversions of a plurality of coordinate components in the second color space; and a correction section for correcting the post-stage sections to reduce a difference between the colors of the color patches outputted by said image output system and a predetermined target color in accordance with the measured values obtained in said measured value obtaining section.

Incidentally, with respect to the profile correction program storage medium storing a profile correction program according to the present invention, here, there is simply shown a basic form. It is noted, however, that the profile correction program storage medium of the present invention includes various modifications of the profile correction program storage medium corresponding to the various modifications of the above-mentioned profile correction apparatus.

DETAILED DESCRIPTION OF PREFERRED EMBODIMENTS

Embodiments of the present invention will be described with reference to the accompanying drawings.

Figure 1:
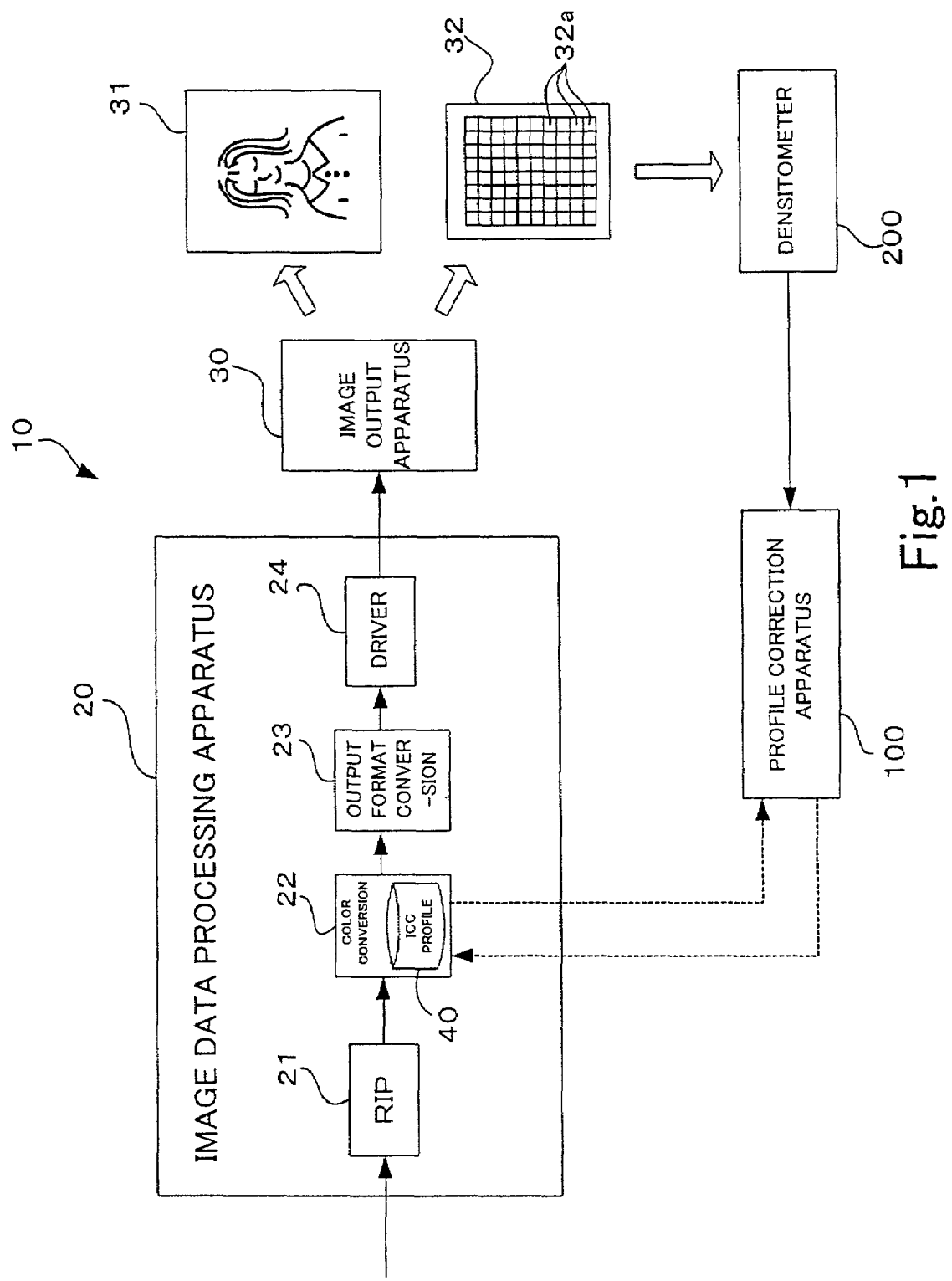
FIG. 1 is a view showing an example of an image output system of the present invention.

FIG. 1 is a view showing an example of an image output system of the present invention.

An image output system 10 comprises an image data processing apparatus 20 constructed by a personal computer, and an image output apparatus 30 for outputting an image with CMYK four colors. The image data processing apparatus 20 receives image data representative of a color image edited on condition that the color image is outputted by an apparatus other than the image output apparatus 30 to apply an image processing, and creates halftone dot data representative of halftone dot images of CMYK four colors, respectively. The image output apparatus 30 is a printer for outputting a color image in accordance with the halftone dot data created by the image data processing apparatus 20.

The image data processing apparatus 20 comprises a RIP (Raster Image Processor) 21, a color conversion section 22, an output format conversion section 23 and a printer driver 24.

The RIP 21 receives, as the image data representative of a color image edited on condition that the above-mentioned other apparatus is concerned, page data describing a page structure of the color image and representing a color of the color image with a predetermined color space (here a RGB color space by way of example). The RIP 21 converts the page data into image data in which a color image is represented in form of an assembly of pixels and a color of pixels is represented with the predetermined color space (the RGB color space).

The color conversion section 22 applies the above-mentioned color conversion to the image data obtained by the RIP 21 for each pixel to obtain image data representative of a color of an image with a color space (a CMYK color space) with which the image output apparatus 30 is associated.

The output format conversion section 23 converts the CMYK data obtained by the color conversion section 22 into halftone dot data representative of halftone dot images of the CMYK four colors.

The printer driver 24 sends the halftone dot data obtained by the output format conversion section 23 to the image output apparatus 30, and controls the image output apparatus 30 to output a color image 31 constructed through superposition of the halftone dots represented by the halftone dot data.

According to the image output system 10 shown in FIG. 1, the image output section comprises the output format conversion section 23, the printer driver 24 and the image output apparatus 30.

The color conversion section 22 performs the above-mentioned color conversion in accordance with an ICC profile 40. The ICC profile 40 is created to meet characteristics of the image output system 10 when the image output system 10 is introduced, and is incorporated into the color conversion section 22. The ICC profile 40 is an example of the color profile referred to the present invention.

Figure 2:
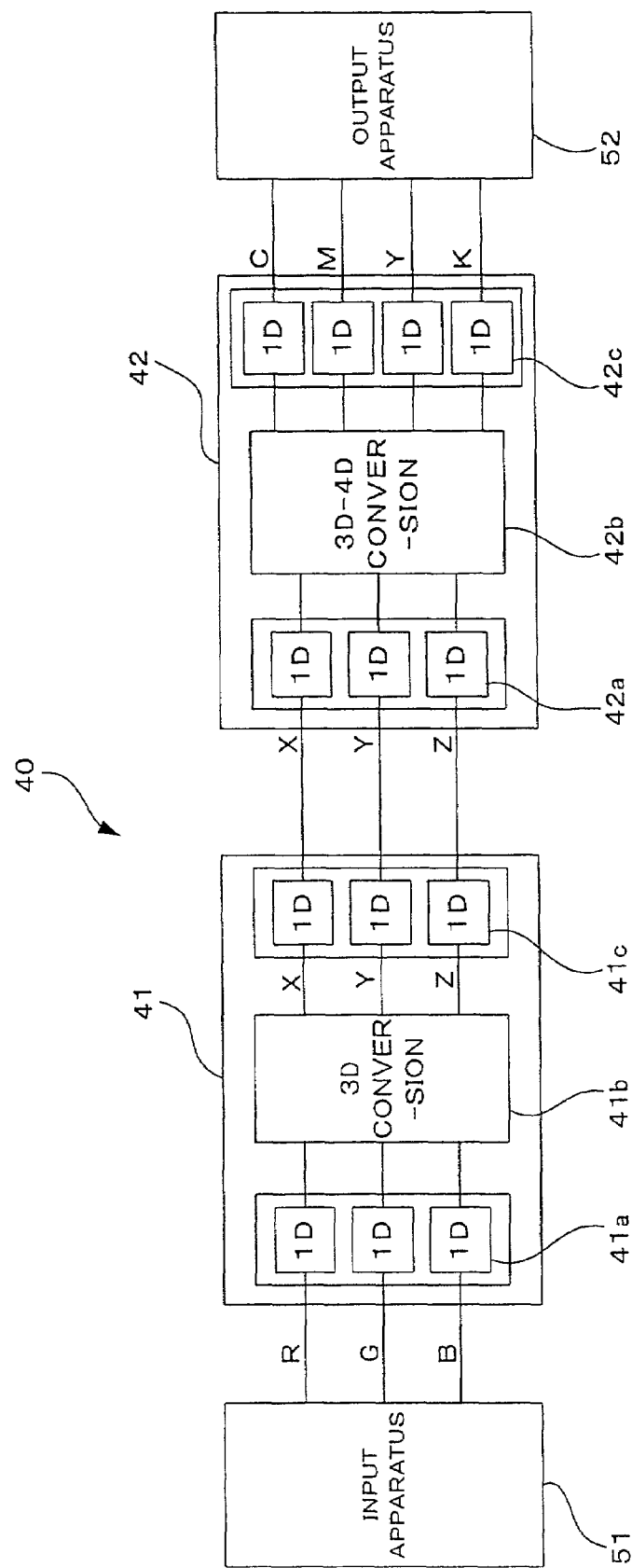
FIG. 2 is a conceptual structural view of an ICC profile.

FIG. 2 is a conceptual structural view of an ICC profile.

FIG. 2 shows a general structure of the ICC profile 40 by way of example.

The ICC profile 40 is one referred to as a device link profile. The device link profile corresponds to one, in which two ICC profiles 41 and 42 are coupled to one another, on a functional basis. Two ICC profiles 41 and 42, which constitutes the device link profile, correspond to an input apparatus 51 for taking in an color image to create image data, and an output apparatus 52 for outputting a color image in accordance with image data. Here, the input apparatus 51 and the output apparatus 52 are named generally as a device. The device includes the image output section incorporated into the above-mentioned image output system. According to the present embodiment, there is exemplarily shown a device link profile for linking the input apparatus 51, which is an input type of device, with the output apparatus 52, which is an output type of device 52. It is acceptable however that the device link profile is one in which mutually different types of two output type of devices are linked with one another. It is noted that the two devices shown in FIG. 2 are simply shown by way of example. In the event that the ICC profile 40 is incorporated into the image output system 10 of FIG. 1, the ICC profile 41 corresponds to the image output apparatus in which it is assumed that image data to be inputted to the image output system 10 is adopted, and the ICC profile 42 corresponds to the image output section that is incorporated into the image output system 10 of FIG. 1.

Hereinafter, there will be continued the explanation as to the device link profile (the ICC profile 42) exemplarily shown in FIG. 2.

The two ICC profiles 41 and 42, which constitute the device profile, define a coordinate conversion between a color space in which a color of a color image is expressed in accordance with image data for the associated device and a color space independent of the device. Here, the image data for the input apparatus 51 is RGB data in which a color is represented with an RGB color space, and the image data for the output apparatus 52 is CMYK data in which a color is represented with a CMYK color space. Further, as the color space independent of the device, here, there is adopted a CIEXYZ color space.

The two ICC profiles 41 and 42 have three stage structures comprising a plurality of pre-stages 41a and 42a, single middle stages 41b and 42b, and a plurality of post-stages 41c and 42c, respectively. The number of the pre-stages 41a and 42a and the number of the post-stages 41c and 42c in the ICC profiles 41 and 42 are the same as the number of dimensions of the color space involved in the object of the coordinate conversion. The pre-stages 41a and 42a and the post-stages 41c and 42c are one-dimensional LUT representative of a linear conversion of coordinate components of a color space (for example, if the RGB space is concerned, the coordinate components are components of R, G and B). The middle stages 41b and 42b are multidimensional-multidimensional LUT representative of the coordinate conversion among the color spaces. Those three stage structures are common to the ICC profile.

The ICC profile 40 (the device link profile), which corresponds to one in which the two ICC profiles 41 and 42 are coupled with one another, defines a coordinate conversion between the color space (RGB color space) associated with the input apparatus 51 and the color space (CMYK color space) associated with the output apparatus 52. It is possible to represent the ICC profile 40 (the device link profile) with the above-mentioned three-stage structure. In the event that the ICC profile 40 is represented with the three-stage structure, the pre-stage of the ICC profile 40 corresponds to the pre-stages 41a of the ICC profile 41, and the post-stage of the ICC profile 40 corresponds to the post-stage 42c of the ICC profile 42. Further, in the event that the ICC profile 40 is represented with the three-stage structure, the middle stage of the ICC profile 40 corresponds to one in which the middle stage 41b and the post-stage 41c of the ICC profile 41 are coupled with the pre-stage 42a and the middle stage 42b of the ICC profile 42.

It is acceptable that the color profile, which is an object of the correction of the present invention, is a device link profile linking two devices, or alternatively an ICC profile associated with one device. In the following explanation, it is assumed that of two ICC profiles 41 and 42 constituting the ICC profile 40 (the device link profile) incorporated into the color conversion section 22 shown in FIG. 1, the ICC profile 42 associated with the image output section of the image output system 10 is a direct correction object. It is noted as will be described later, that according to the present invention, the above-mentioned post-stage is corrected. Correction of the post-stage of the ICC profile 42 means correction of the post-stage of the device link profile. For this reason, in the following explanation, it happens that the correction object is not specifically distinguished.

FIG. 1 shows a profile correction apparatus 100 for correcting an ICC profile, and a densitometer 200 used when the profile correction apparatus 100 corrects the ICC profile. The densitometer 200 measures an optical density of color patches 32a constituting a predetermined color chart 32 outputted from the image output system 10. The color chart 32 consists of tone patches of CMYK four primary colors. The profile correction apparatus 100 corrects the post-stage of the ICC profile in accordance with the measured values of the color patches 32a measured by the densitometer 200.

Figure 3:
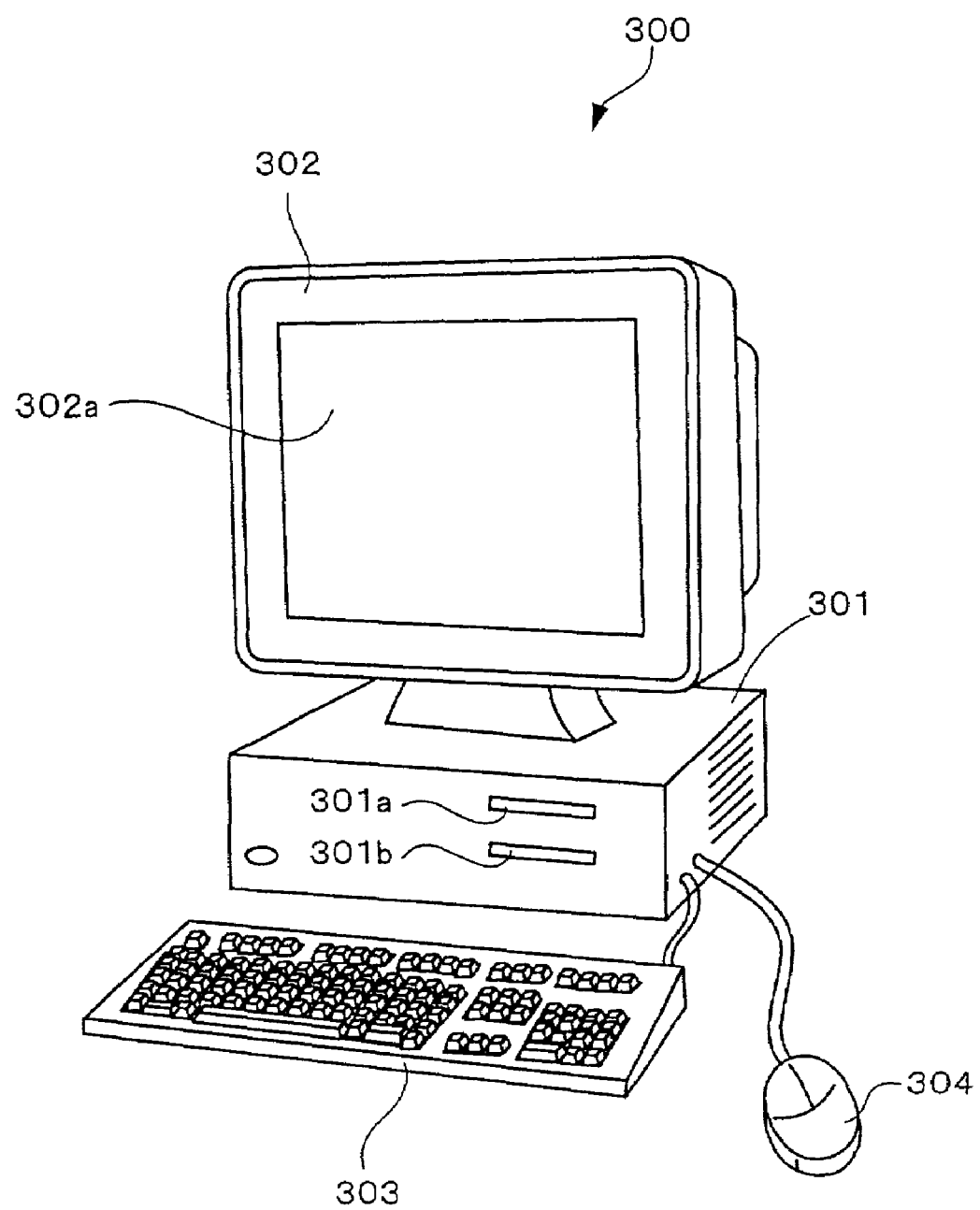
FIG. 3 is a perspective view of a personal computer constructing a profile correction apparatus.
Figure 4:
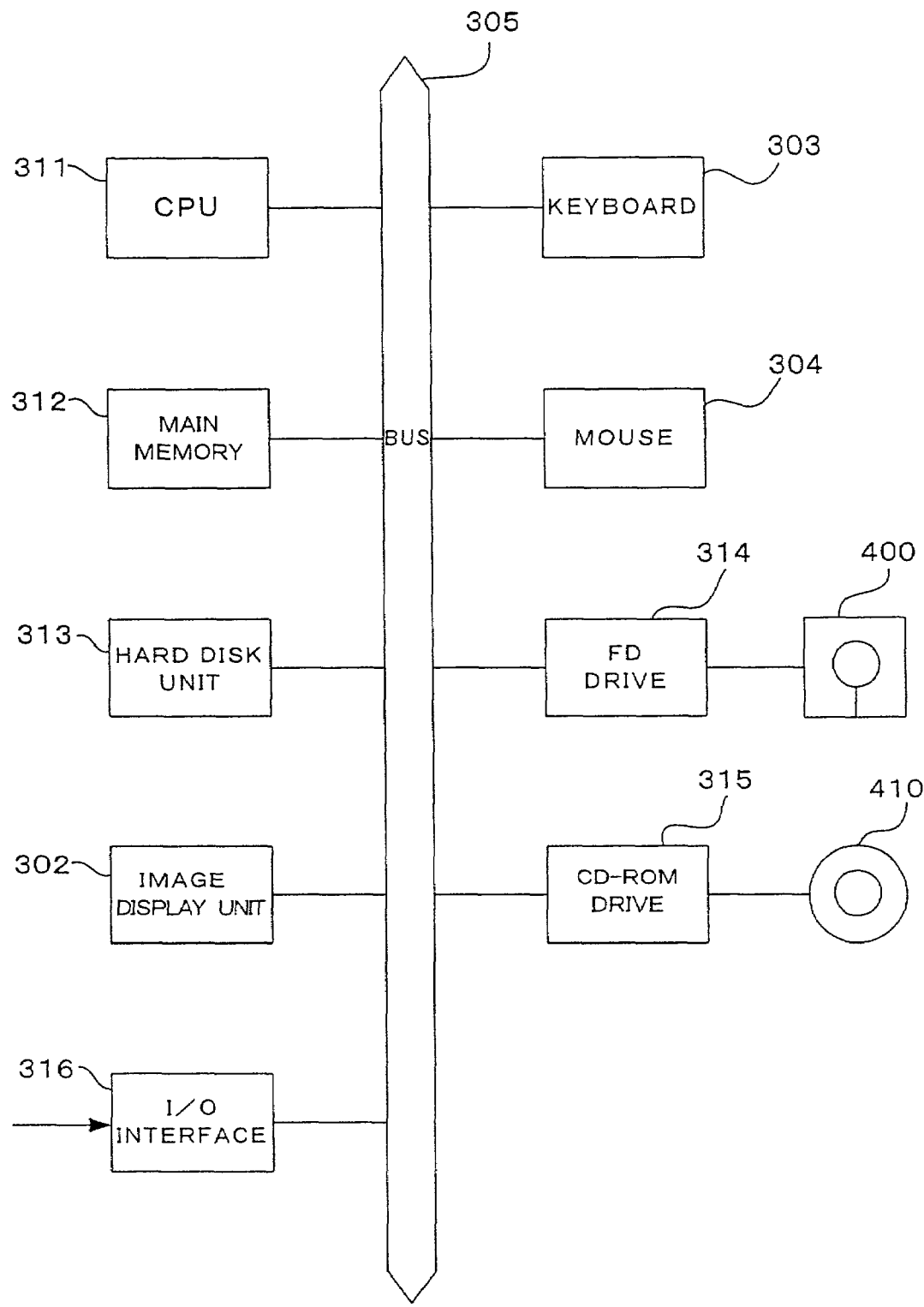
FIG. 4 is a hardware structural view of the personal computer constructing a profile correction apparatus.

FIG. 3 is a perspective view of a personal computer constructing the profile correction apparatus 100. FIG. 4 is a hardware structural view of the personal computer constructing the profile correction apparatus.

The personal computer 300 comprises, on an external appearance, a main frame unit 301, an image display unit 302 for displaying an image on a display screen 302a in accordance with an instruction from the main frame unit 301, a keyboard 303 for inputting various sorts of information to the main frame unit 301 in accordance with a key operation, and a mouse 304 for inputting an instruction according to, for example, an icon and the like, through designation of an optional position on the display screen 302a, the icon and the like being displayed on the position on the display screen 302a. The main frame unit 301 has a flexible disk (FD) mounting slot 301a for mounting a flexible disk (FD), and a CD-ROM mounting slot 301b for mounting a CD-ROM.

The main frame unit 301 comprises, as shown in FIG. 4, a CPU 311 for executing a various types of program, a main memory 312 in which a program stored in a hard disk unit 313 is read out and developed for execution by the CPU 311, the hard disk unit 313 for saving various types of programs and data, an FD drive 314 for accessing a flexible disk 400 mounted thereon, a CD-ROM drive 315 for accessing a CD-ROM 410 mounted thereon, and an I/O interface 316 connected to a densitometer 200, to receive measured values from the densitometer 200. These various types of elements are connected via a bus 305 to the image display unit 302, the keyboard 303 and the mouse 304.

The CD-ROM 410 stores therein a profile correction program according to an embodiment of the present invention. The CD-ROM 410 is mounted on the CD-ROM drive 315 so that the profile correction program, which is stored in the CD-ROM 410, is up-loaded on the personal computer 300 and is stored in the hard disk unit 313. When the profile correction program is executed on the personal computer 300, the profile correction apparatus 100 shown in FIG. 1 is implemented. In other words, the profile correction apparatus 100 shown in FIG. 1 is constituted by a combination of the personal computer 300 and the profile correction program storage medium according to the present embodiment.

Figure 5:
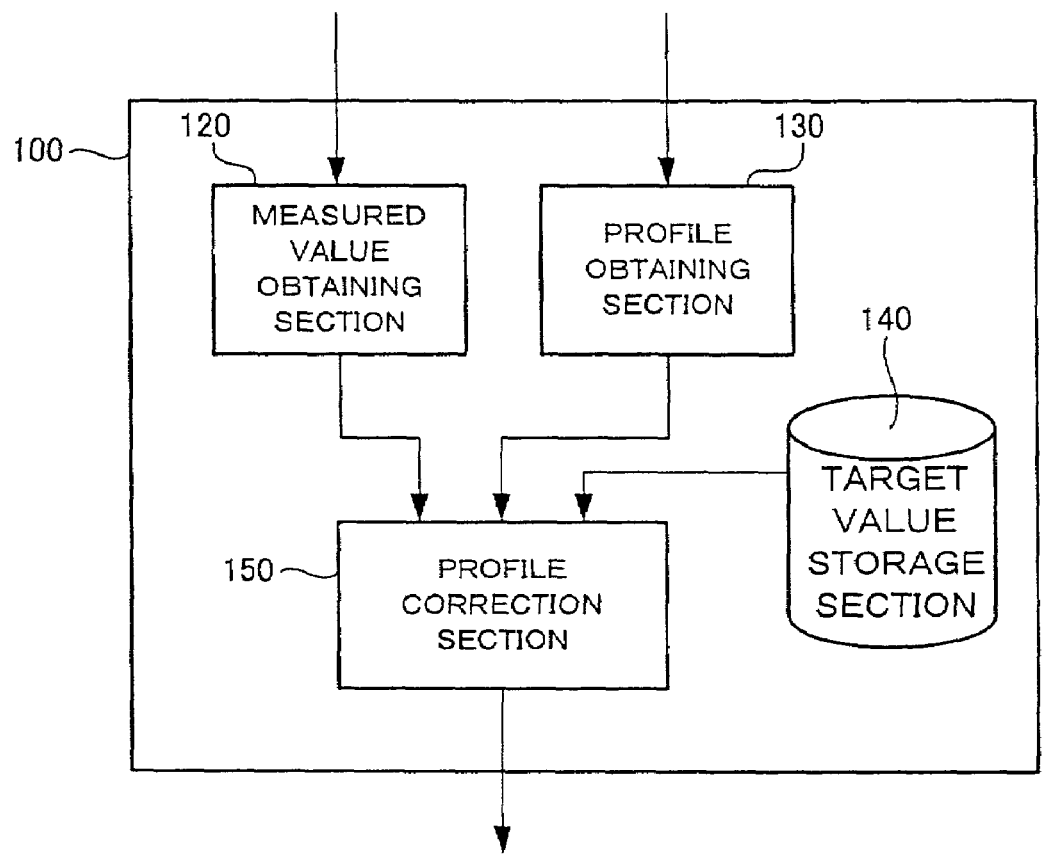
FIG. 5 is a functional block diagram of a profile correction apparatus.

FIG. 5 is a functional block diagram of a profile correction apparatus.

A profile correction apparatus 100 comprises a measured value obtaining section 120, a profile obtaining section 130, a target value storage section 140 and a profile correction section 150. The structure elements, such as the measured value obtaining section 120 and the profile obtaining section 130 shown in FIG. 5, are one in which the hardware constituting the personal computer 300 and the software constituting the above-mentioned profile correction program according to the present embodiment are combined. Accordingly, FIG. 5 also shows an example of a program structure in a profile correction program of the present invention.

The profile obtaining section 130 obtains, prior to the correction of the ICC profile, the ICC profile (the ICC profile associated with the image output section) of the correction object via the flexible disk. The target value storage section 140 stores, prior to the correction of the ICC profile, target values representative of desired colors of the color patches 32a constituting the color chart 32. Here in order to obtain an ideal color image the target value storage section 140 stores, as the target values, measured values in which immediately after the image output system 10 is initialized the color chart 32 is outputted and the color patches 32a are measured.

The measured value obtaining section 120 obtains the measured values from the densitometer 200 to correct the ICC profile. The profile correction section 150 corrects the ICC profile so that colors of the color patches 32a constituting the color chart 32 approach colors represented by the measured values stored in the target value storage section 140 as the target values. Accordingly, the profile correction apparatus 100 corrects change with elapse after the initial regulation.

Hereinafter, the procedure of correction of the profile will be described referring to FIG. 1 and FIG. 5.

Figure 6:
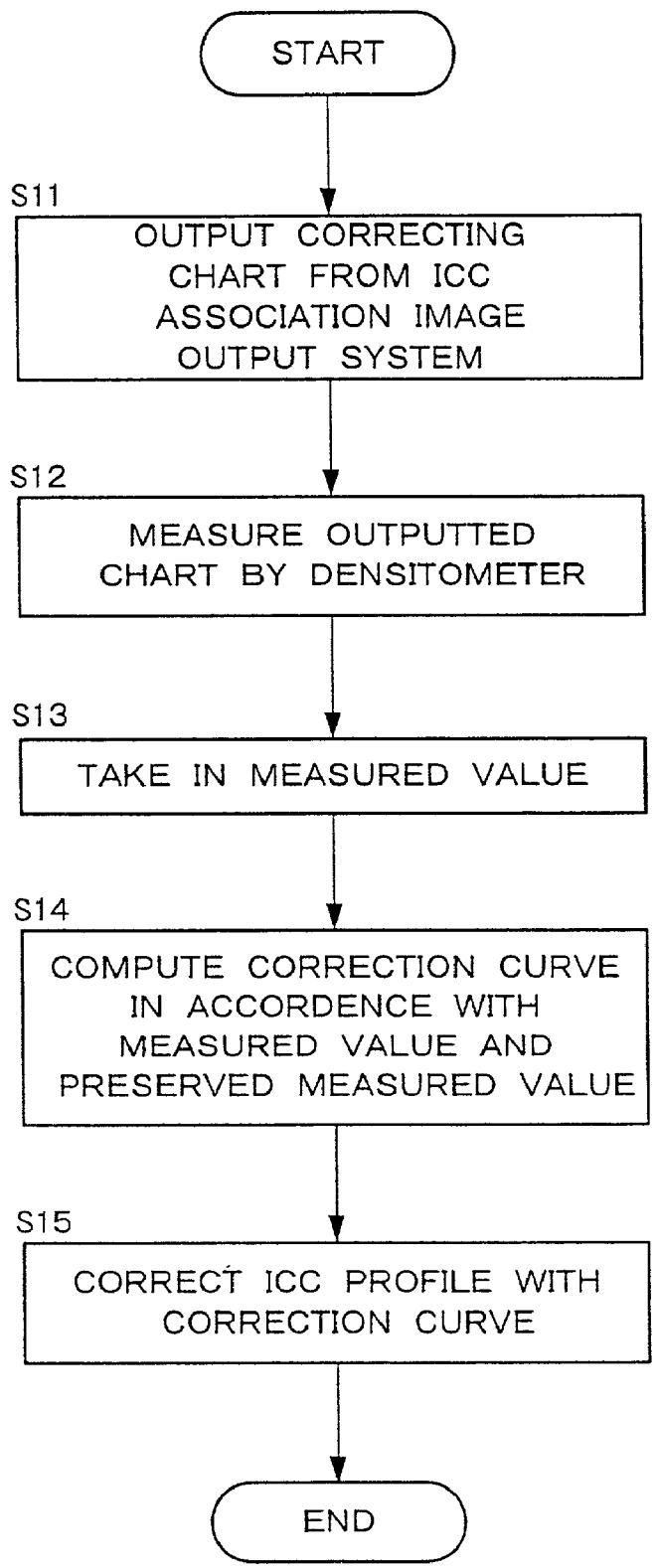
FIG. 6 is a flowchart useful for understanding a procedure in which a profile correction apparatus is used to correct a profile.

FIG. 6 is a flowchart useful for understanding a procedure in which the profile correction apparatus 100 is used to correct a profile.

Step S13 to step S15 of the flowchart shown in FIG. 6 correspond to the profile correction program according to the embodiment of the present invention.

First, in a step S11, the image output system 10 outputs the color chart 32 shown in FIG. 1 as a chart for the profile correction. Next, the process goes to a step S12 in which the densitometer 200 shown in FIG. 1 is used to measure optical density of the color patches 32a constituting the color chart 32. As mentioned above, the color chart 32 consists of tone patches of CMYK four primary colors, and is extremely small in the number of patches as compared with a color chart including a number of mixed color patches, which is used when a color profile is created. Thus, the use of the color chart 32 makes it possible to readily measure the optical density of the color patches 32a reducing one trouble for measurement. The densitometer 200 is a measurement device, which is cheap in such an extent that a user of an image output system possesses as a device for correcting change with elapse.

Thus, when the patches of the color chart are measured, the process goes to the step S13 in which the measured value obtaining section 120 shown in FIG. 5 obtains the measured value, and then goes to the step S14 in which the profile correction section 150 computes the correction curve in accordance with the obtained measured value and the target value (measured value of the color chart immediately after the initial regulation) stored in the target value storage section 140 shown in FIG. 5.

Figure 7:
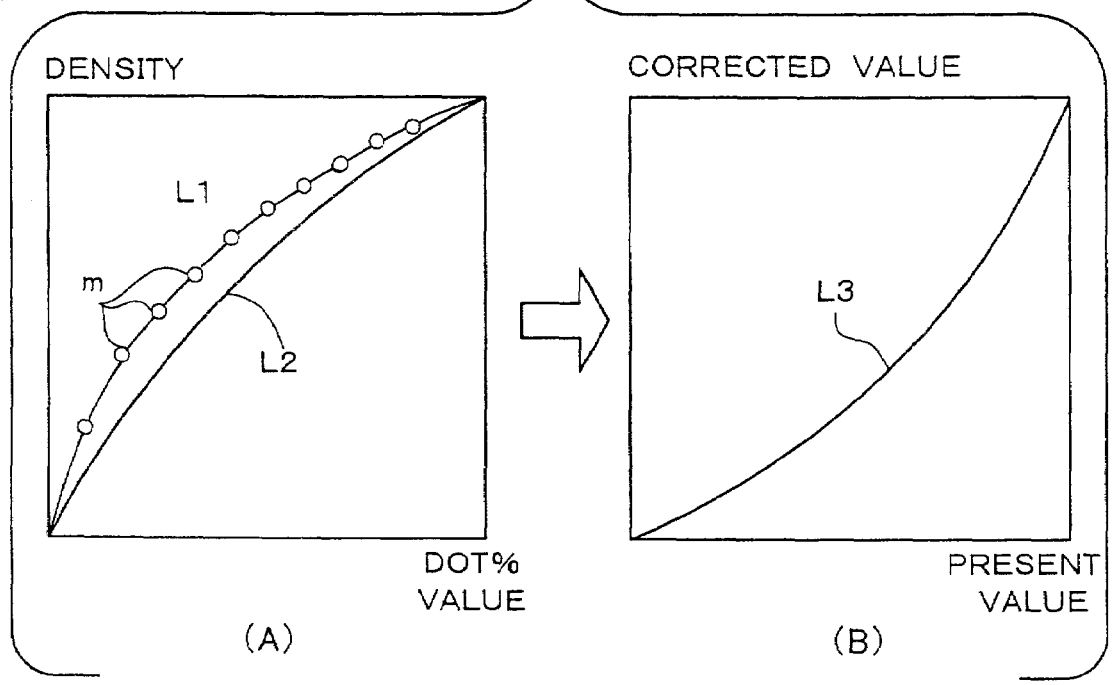
FIG. 7 is an explanatory view useful for understanding a computing method of a correction curve.

FIG. 7 is an explanatory view useful for understanding a computing method of a correction curve.

A part (A) of FIG. 7 shows a graph representative of the measured values obtained in the step S13 of FIG. 6 and the target value stored in the target value storage section 140 shown in FIG. 5. The horizontal axis of the graph represents dot percent (dot %) of form plates of CMYK represented by CMYK data associated with the color patches, and the vertical axis of the graph represents density of the color patches. A curve L1, which is expressed by circled marks m, is representative of actual measurements of the color patches at the time of correction, and a curve L2 having no marks is representative of a target value. Those curves L1 and L2 are obtained for each colors of CMYK.

When the curves L1 and L2 are obtained, there is computed a correction curve L3 representative of a correction relation of the dot percent to cancel a difference between the curves L1 and L2. A horizontal axis of the graph shown in a part (B) of FIG. 7 is representative of the dot percent before the correction, and a vertical axis is representative of the dot percent after correction. A relation among the curves L1 and L2 and the correction curve L3 is established in such a manner that when the dot percent represented by points on the curve L1 is corrected in accordance with a relation represented by the correction curve L3, the points after the correction are on the curve L2. The correction curve is also computed for each color of CMYK.

In the step S14 of FIG. 6, the profile correction section 150 shown in FIG. 5 computes the correction curve in accordance with the procedure as mentioned above. Thereafter, in the step S15, the profile correction section 150 corrects the post-stages of the ICC profile obtained by the profile obtaining section 130 in accordance with the correction curve.

Figure 8:
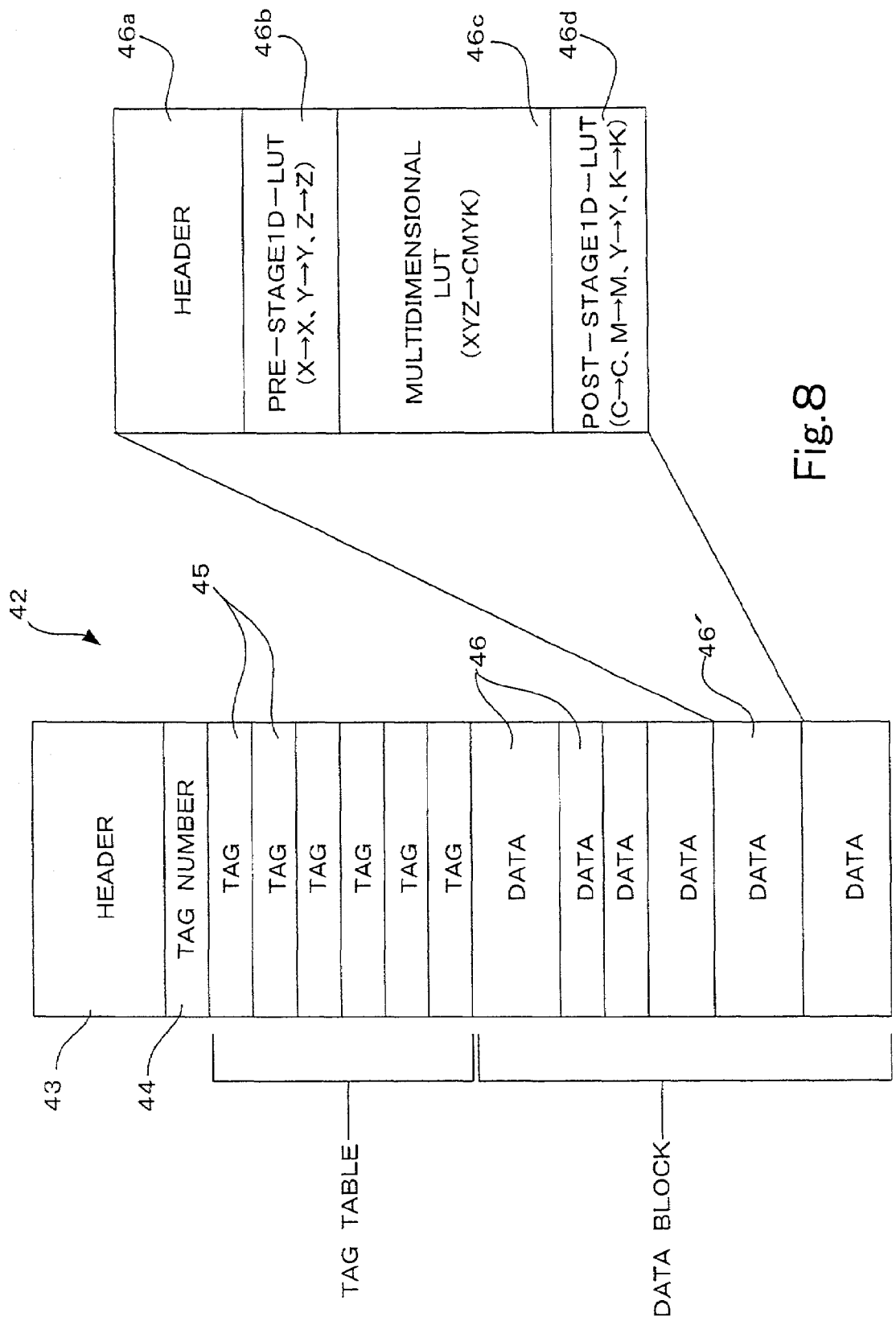
FIG. 8 is a view showing a data structure of an ICC profile.

FIG. 8 is a view showing a data structure of an ICC profile.

FIG. 8 shows a data structure of the ICC profile 42 defining a coordinate conversion between the XYZ and the CMYK color space, which is associated with the image output section of the image output system 10, of the two ICC profiles 41 and 42 (cf. FIG. 2) constituting the ICC profile 40 (a device link profile) shown in FIG. 1. It is noted that the data structure here shown is a data structure common to the ICC profile.

The top of the ICC profile 42 is provided with a predetermined header 43, and thereafter a tag number 44 is described. Subsequent to the description of the tag number 44, there is provided a tag table consisting of tags 45 the number of which is the same as the tag number 44. Subsequent to the tag table, there is provided a data block consisting of data 46 in which a description position is indicated by the associated tag 45. Of the data 46 constituting the data block, data 46' described at a predetermined position is data representative of a LUT. The data 46' consists of a predetermined header portion 46a, a data portion 46b representative of a one-dimensional LUT of the pre-stage 42a, a data portion 46c representative of multidimensional-multidimensional LUT of the middle stage 42b, and a data portion 46c representative of a one-dimensional LUT of the post-stage 42c. The data portions 46b, 46c and 46d representative of the LUT store sets of data values of the input side and data values of the output side by a predetermined number, respectively. Here, data values of both the input side and the output side in the data portion 46b associated with the pre-stage represent CIEXYZ values. Data value of the input side in the data portion 46c associated with the middle stage represents CIEXYZ values. Data value of the output side represents dot percent. Further data values of both the input side and the output side in the data portion 46d associated with the post-stage represent dot percent of colors of CMYK.

In the step S15 of FIG. 6, the data value of the output side in the data portion 46d associated with the post-stage is replaced by a value representative of the dot percent corrected in accordance with the correction relation represented by the correction relation, so that the correction of the ICC profile 42 is performed.

The ICC profile 42 thus corrected is incorporated into the image output system 10 shown in FIG. 1 as a part of the ICC profile 40 (the device link profile). The color conversion section 22 performs the color conversion in accordance with the ICC profile 40 after the correction. Thus, change with elapse of the image output system 10 is corrected.

According to the above explanation, the profile correction apparatus 100 obtains the measured values from the densitometer 200. However, it is acceptable that the profile correction apparatus referred to in the present invention obtains the measured values from a colorimeter.

Figure 9:
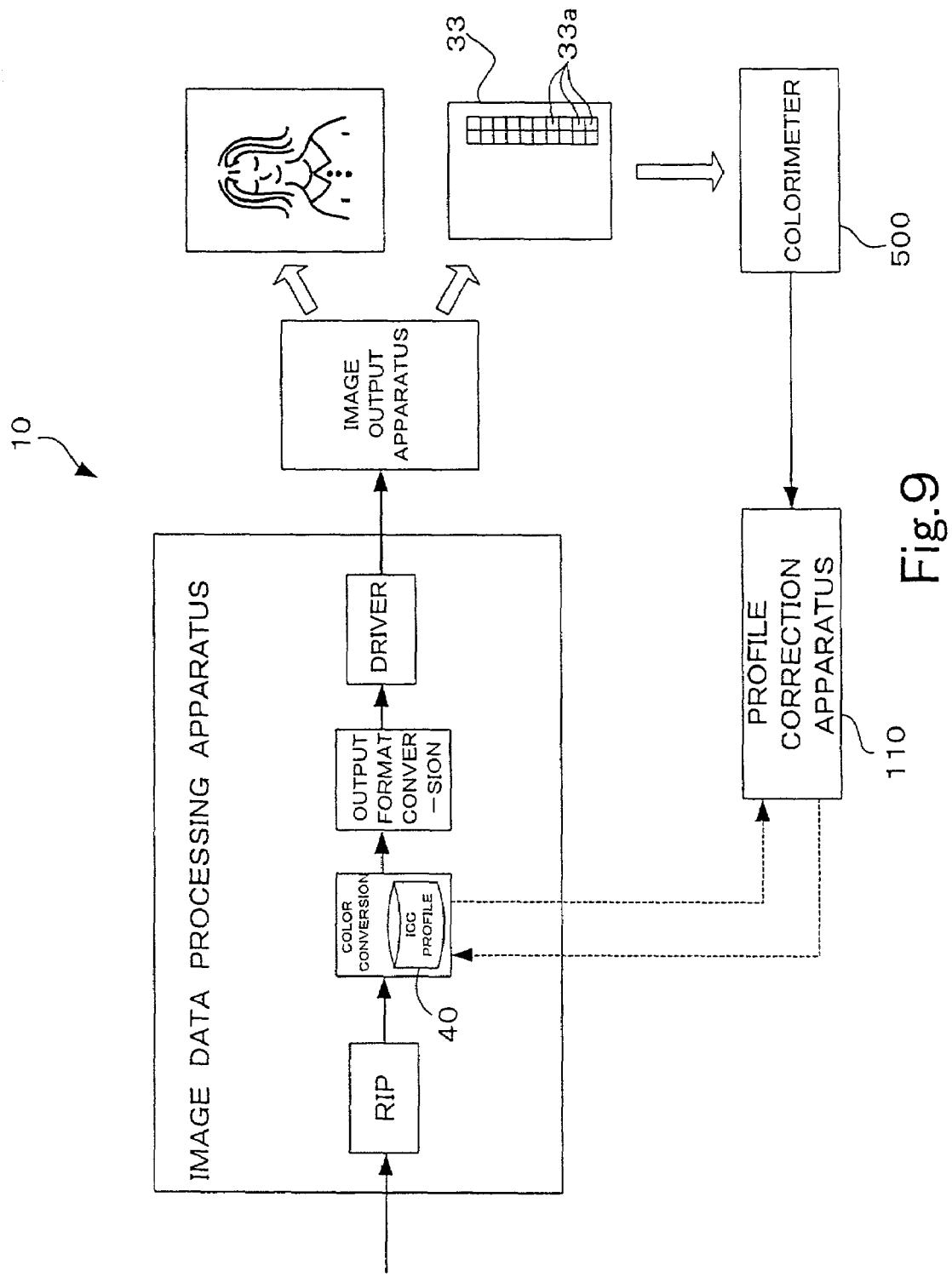
FIG. 9 is a view showing a profile correction apparatus for obtaining a measured value from a colorimeter.

FIG. 9 is a view showing a profile correction apparatus for obtaining a measured value from a colorimeter.

A profile correction apparatus 110 shown in FIG. 9 is substantially same as the profile correction apparatus 100 shown in FIG. 1 except for the point that the measured values are obtained from a colorimeter 500.

In the event that the profile correction apparatus 110 shown in FIG. 9 corrects the ICC profile 40, the image output system 10 outputs a gray chart 33 consisting of gray tone patches 33a, and colorimeter 500 measures colors of the gray tone patches 33a to obtain colorimeter values such as CIEXYZ values and CIELAB values. The profile correction apparatus 110 obtains the colorimeter values as measured values and corrects the post-stage of the ICC profile 40 in accordance with the procedure as mentioned above. However, as the target value, of course, there are used colorimeter values representative of ideal colors of the gray tone patches 33a.

The number of gray tone patches 33a constituting the gray chart 33 is further less than the number of color patches 32a constituting the color chart 32 shown in FIG. 1. For this reason, one trouble for measuring the gray tone patches 33a is extremely saved, and thus it is possible to readily perform measurements. Further, it is sufficient for the colorimeter 500 to use such a cheap colorimeter that colors of the patches are manually measured one by one and thus a user of an image output system can possess the colorimeter 500 as the correcting use for change with elapse. Further, the use of the colorimetric values of the gray tone patches 33a makes it possible to expect the correction with high precision taking into consideration an effect that colors bring about by overlapping of halftone dots mutually different from each other in color.

Incidentally, according to the above-mentioned embodiments, the densitometer and the colorimeter are connected to the profile correction apparatus to obtain the measured values. It is acceptable however that a profile correction apparatus of the present invention is one in which measured values are entered through a keyboard and the like.

Further, according to the above-mentioned embodiments, the target value is stored in the target value storage section.

It is acceptable however that a profile correction apparatus of the present invention obtains, as the target value, the measured values in which patches of the chart created at the time of the initial setting of the image output system 10 are measured at the time of correction. Further, according to the above-mentioned embodiments, there is used the target value in which the target color referred to in the present invention is represented by the same dimensional numerical value as the measured value. It is acceptable however that the target color referred to in the present invention is represented by a dimensional numerical value different from the measured value.

Furthermore, according to the above-mentioned embodiments, the color profile of the correction object is obtained from the image output system via the flexible disk, and the color profile after the correction is also incorporated into the image output system via the flexible disk. It is acceptable however that a profile correction apparatus of the present invention inputs and outputs a color profile via LAN (Local Area Network).

While the above-mentioned profile correction section computes a correction curve and corrects the color profile in accordance with the correction curve, this is simply an example, and a correction method of correcting the post-stage of the color profile by the correction section referred to in the present invention is not restricted to the above-mentioned method.

Still further, according to the above-mentioned embodiments, a profile is modified for the purpose of modification of change with elapse. The profile correction apparatus of the present invention is not restricted to such an object.

Still furthermore, according to the above-mentioned embodiments, the profile correction program is provided with software components associated with the measured value obtaining section and the like. Any one is acceptable, as the profile correction program of the present invention, which implements functions the measured value obtaining section and the correction section referred to in the present invention, and it is acceptable that the profile correction program of the present invention is a united software which is not divided into software components.

As mentioned above, according to the present invention, it is possible to correct a color profile saving one trouble.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A profile correction apparatus comprising:
a measured value obtaining section for obtaining measured values in which a predetermined physical amount involved in colors of color patches is measured, said color patches being outputted by an image output system in which first color image data represented with a first color space is converted into second color image data which is represented with a second color space in accordance with a color profile, and the color image is outputted in accordance with the second color image data, said color profile consisting of a plurality of pre-stage sections defining linear conversions of a plurality of coordinate components in the first color space, a middle stage section defining a coordinate conversion from the first color space to the second color space, and a plurality of post-stage sections defining linear conversions of a plurality of coordinate components in the second color space; and
a correction section for correcting the post-stage sections to reduce a difference between the colors of the color patches outputted by said image output system and a predetermined target color in accordance with the measured values obtained in said measured value obtaining section.

2. A profile correction apparatus according to claim 1, wherein said measured value obtaining section obtains measured values in which optical densities associated with the plurality of coordinate components in the second color space are measured on primary color patches outputted by said image output system.

3. A profile correction apparatus according to claim 1, wherein said measured value obtaining section obtains colorimetric values on mixed color patches outputted by said image output system.

4. A computer readable storage medium storing a profile correction program which causes a computer to operate as a profile correction apparatus, when said profile correction program is incorporated into the computer, said profile correction apparatus comprising:
a measured value obtaining section for obtaining measured values in which a predetermined physical amount involved in colors of color patches is measured, said color patches being outputted by an image output system in which first color image data represented with a first color space is converted into second color image data which is represented with a second color space in accordance with a color profile, and the color image is outputted in accordance with the second color image data, said color profile consisting of a plurality of pre-stage sections defining linear conversions of a plurality of coordinate components in the first color space, a middle stage section defining a coordinate conversion from the first color space to the second color space, and a plurality of post-stage sections defining linear conversions of a plurality of coordinate components in the second color space; and
a correction section for correcting the post-stage sections to reduce a difference between the colors of the color patches outputted by said image output system and a predetermined target color in accordance with the measured values obtained in said measured value obtaining section.

5. A profile correction apparatus according to claim 1, said measured value obtaining section comprising a densitometer, which measures optical densities of said color patches of a color chart to obtain the measured values, and
wherein said color patches are tone patches having a plurality of colors.

6. A profile correction apparatus according to claim 1, said measured value obtaining section comprising a colorimeter, which measures colors of gray tone patches output on a gray chart to obtain measured values, and
wherein said gray chart is output by said image output system.

7. A computer readable storage medium according to claim 4, wherein said measured value obtaining section comprises a densitometer, which measures optical densities of said color patches of a color chart to obtain the measured values,
wherein said color patches are tone patches having a plurality of colors.

8. A computer readable storage medium according to claim 4,
   wherein said measured value obtaining section comprises a colorimeter, which measures colors of gray tone patches output on a gray chart to obtain measured values, and
   wherein said gray chart is output by said image output system.

9. A profile correction apparatus according to claim 1, wherein the first color space and the second color space are device-dependent color spaces.

10. A computer readable storage medium according to claim 4, wherein the first color space and the second color space are device-dependent color spaces.

* * * * *